United States Patent
Zhauniarovich et al.

(10) Patent No.: US 11,206,286 B2
(45) Date of Patent: Dec. 21, 2021

(54) METHODS AND SYSTEMS FOR REDUCING UNWANTED DATA TRAFFIC IN A COMPUTER NETWORK

(71) Applicant: Qatar Foundation for Education, Science and Community Development, Doha (QA)

(72) Inventors: Yury Zhauniarovich, Uzda (BY); Priyanka Dodia, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 232 days.

(21) Appl. No.: 16/430,869

(22) Filed: Jun. 4, 2019

(65) Prior Publication Data
US 2020/0389487 A1 Dec. 10, 2020

(51) Int. Cl.
*H04L 29/06* (2006.01)

(52) U.S. Cl.
CPC .... *H04L 63/1458* (2013.01); *H04L 29/06925* (2013.01); *H04L 63/0236* (2013.01); *H04L 63/1416* (2013.01); *H04L 63/1491* (2013.01); *H04L 2463/141* (2013.01); *H04L 2463/142* (2013.01); *H04L 2463/143* (2013.01)

(58) Field of Classification Search
CPC ........... H04L 63/1458; H04L 29/06925; H04L 63/1416; H04L 63/1491; H04L 63/0236; H04L 2463/141; H04L 2463/142; H04L 2463/143
See application file for complete search history.

(56) References Cited

U.S. PATENT DOCUMENTS

| | | | | |
|---|---|---|---|---|
| 9,430,646 B1* | 8/2016 | Mushtaq | ............. | H04L 63/1425 |
| 2004/0250124 A1* | 12/2004 | Chesla | .................. | G06F 21/552 |
| | | | | 726/13 |
| 2008/0270601 A1* | 10/2008 | Ishikawa | ................. | H04L 12/12 |
| | | | | 709/224 |
| 2016/0050132 A1* | 2/2016 | Zhang | .................. | H04L 43/026 |
| | | | | 370/252 |
| 2017/0272465 A1* | 9/2017 | Steele | .................. | H04L 63/107 |
| 2018/0351992 A1* | 12/2018 | Lee | ......................... | H04L 63/00 |

OTHER PUBLICATIONS

Yury Zhauniarovich, et al., "Sorting the Garbage: Filtering Out DRDoS Amplification Traffic in ISP Networks", ACSAC https://www.acsac.org/2018/cfp, published Jun. 15, 2018.
Yury Zhauniarovich, et al., "Sorting the Garbage: Filtering Out DRDoS Amplification Traffic in ISP Networks", NetSoft http://netsoft2018.ieee-netsoft.org, published Dec. 17, 2018.

(Continued)

*Primary Examiner* — Huan V Doan
(74) *Attorney, Agent, or Firm* — Cooper Legal Group LLC

(57) ABSTRACT

A method for reducing unwanted data traffic in a computer network due to a Distributed Reflection Denial of Service (DRDoS) attack. The method comprises operating a filtering module in a normal mode or a blocking mode to allow or block requests from being communicated within a computer network in response to data from a honeypot device in the computer network. The method allows the honeypot device to continue to monitor further attack requests that are received during the DRDoS attack.

29 Claims, 3 Drawing Sheets

(56) References Cited

OTHER PUBLICATIONS

Yury Zhauniarovich, et al., "Sorting the Garbage: Filtering Out DRDoS Amplification Traffic in ISP Networks", IEEE S&P https://www.ieee-security.org/TC/SP2018/, published Oct. 1, 2018.
Open vSwitch. Retrieved May 27, 2018 from https://www.openvswitch.org.
OpenDaylight. Retrieved May 24, 2018 from https://www.opendaylight.org.
Ryu SDN Framework. Retrieved May 24, 2018 from https://osrg.github.io/ryu/.
The POX Network Software Platform. Retrieved May 24, 2018 from https://github.com/noxrepo/pox.
Ahmad Ariff Aizuddin, et al., 2017 "DNS Amplification Attack Detection and Mitigation via sFlow with Security-centric SDN", In Proceedings of the 11th Inter-national Conference on Ubiquitous Information Management and Communication, Article 3, 7 pages, 2017.
Akamai. State of the Internet Connectivity Q1 2017 Report. Retrieved Jun. 1, 2018 from https://www.akamai.com/US/en/multimedia/documents/state-of-the-internet/q-2017-state-of-the-internet-connectivity-report.pdf.
Akamai. State of the Internet Connectivity Q4 2017 Report. Retrieved May 9, 2018 from https://www.akamai.com/us/en/multimedia/documents/state-of-the-internet/q4-2017-state-of-the-internet-connectivity-report.pdf.
Apache Parquet. Retrieved May 27, 2018 from https://parquet.apache.org/.
Jose Arteaga, et al., "CLDAP Reflection DDoS", https://www.akamai.com/us/en/multimedia/documents/state-of-the-internet/cldap-threat-advisory.pdf, 2017.
Michael Aupetit, et al., "Visualization of Actionable Knowledge to Mitigate DRDoS Attacks" 2016, in Proceedings of the 2016 IEEE Symposium on Visualization for Cyber Security (VizSec). 1-8.
Michael Backes, et al., "On the Feasibility of TTL-based Filtering for DRDoS Mitigation" 2016, in Proceedings of the 19th International Symposium on Research in Attacks, Intrusions and Defenses, pp. 303-322.
L. Berti-Equille, et al., "Profiling DRDoS Attacks with Data Analytics Pipeline," in Proceedings of the 2017 ACM Conference on Information and Knowledge Management, 2017, pp. 1983-1986.
C. C. Chen, et al., "Detecting amplification attacks with Software Defined Networking", 2017, in Proceedings of the 2017 IEEE Conference on Dependable and Secure Computing, pp. 195-201, https://doi.org/10.1109/DESEC.2017.8073807.
L. Gao, et al., "The extent of AS path inflation by routing policies," in Proceedings of the 2002 IEEE Global Telecommunications Conference, vol. 3, Nov. 2002, pp. 2180-2184.
Greg Goth, "Software-Defined Networking Could Shake Up More than Packets", IEEE Internet Computing, vol. 15, issue 4 (2011), pp. 6-9.
GNS3, The Software that Empowers Network Professionals. Retrieved May 27, 2018 from https://www.gns3.com.
Mukta Gupta, et al., "Fast, Accurate Simulation for SDN Prototyping", in Proceedings of the Second ACM SIGCOMM Workshop on Hot Topics in Software Defined Networking, 2013, pp. 31-36.
K. He, et al., "Latency in Software Defined Networks: Measurements and Mitigation Techniques," in Proceedings of the 2015 ACM SIGMETRICS International Conference on Measurement and Modeling of Computer Systems, 2015, pp. 435-436.
How UK ISPs are charged for broadband—the cost of IPStream. Retrieved Mar. 20, 2018 from https://community.plus.net/t5/Plusnet-Blogs/How-UK-ISPs-are-charged-for-broadband-the-cost-of-IPStream/ba-p/1314570.
M. Jackson. (Oct. 2017) Ofcom Enhances UK Code of Practice for Broadband ISP Speeds. [Online]. Available: https://www.ispreview.co.uk/index.php/2017/10/ofcom-enhances-uk-code-practice-broadband-isp-speeds-2017.html.
O. Kharif. (Sep. 2018) YouTube, Netflix Videos Found to Be Slowed by Wireless Carriers. [Online], Available: https://www.bloomberg.com/news/articles/2018-09-04/youtube-and-netflix-throttled-by-carriers-research-finds.
Sam Kottler. Feb. 28, 2018 DDoS Incident Report. Retrieved Mar. 11, 2018 from https://githubengineering.com/ddos-incident-report/.
Lukas Krämer, et al., "AmpPot: Monitoring and Defending Against Amplification DDoS Attacks", in Proceedings of the 18th International Symposium Research in Attacks, Intrusions, and Defenses, 2015, pp. 615-636.
Diego Kreutz, et al., "Software-Defined Networking:A Comprehensive Survey", Proceedings of the IEEE, Jan. 2015, vol. 103, issue 1, pp. 14-76.
Johannes Krupp, et al., "Identifying the Scan and Attack Infrastructures Behind Amplification DDoS Attacks", in Proceedings of CCS, 2016, pp. 1426-1437.
Johannes Krupp, et al., "Linking Amplification DDoS Attacks to Booter Services", Proceedings of RAID, Oct. 12, 2017, pp. 427-449.
Jun Li, et al., "Drawbridge: Software-defined DDoS-resistant Traffic Engineering", 2014 in Proceedings of the 2014 ACM Conference on SIGCOMM, pp. 591-592.
P. Marques, et al., "Dissemination of Flow Specification Rules", Internet Requests for Comments, RFC Editor, RFC 5575, Aug. 2009.[Online]. Available: http://www.rfc-editor.org/rfc/rfc5575.txt.
N. McKeown, et al., "OpenFlow: Enabling Innovation in Campus Networks", ACM SIGCOMM Computer Communication Review, Apr. 2008, vol. 38, Issue 2, pp. 69-74.
https://twitter.com/037. [n. d.]. MEMFIXED DDoS Mitigation Tool. Retrieved Mar. 20, 2018 from https://github.com/649/Memfixed-Mitigation-Tool.
S. M. Mousavi, et al., "Early detection of DDoS attacks against SDN controllers", in Proceedings of the 2015 International Conference on Computing, Networking and Communications, 2015, pp. 77-81.
Quamar Niyaz, et al., "A Deep Learning Based DDoS Detection System in Software-Defined Networking (SDN)", EAI Endorsed Transactions on Security and Safety, Nov. 22, 2016 17.
2014. NTP Amplification Attacks Using CVE-2013-5211. Retrieved Mar. 31, 2018 from https://www.us-cert.gov/ncas/alerts/TA14-013A.
0Kee Team, "How to Generate 2TB/s Reflection DDoS Data Flow via a Family Network", Retrieved Mar. 11, 2018 from http://powerofcommunity.net/poc2017/shengbao.pdf.
Jon Postel, "Transmission Control Protocol DARPA Internet Program Protocol Specification", Technical Report 7, Sep. 1981, RFC Editor.http://www.rfc-editor.org/rfc/rfc793.txt[31].
Christian Rossow, "Amplification Hell: Revisiting Network Protocols for DDoS Abuse", Proceedings of the 2014 Network and Distributed System Security (NDSS) Symposium, Feb. 23-26, 2014.
Fabrice J. Ryba, et al., "Amplification and DRDoS Attack Defense—A Survey and New Perspectives", CoRR abs/1505.07892, May 29, 2015, http://arxiv.org/abs/1505.07892.
Rishikesh Sahay, et al., "Towards autonomic DDoS mitigation using software defined networking", Proceedings of the NDSS Workshop on Security of Emerging Networking Technologies, Jan. 18, 2016, Internet Society.
A. Sardana, et al., "Detection and Honeypot Based Redirection to Counter DDoS Attacks in ISP Domain", Proceedings of the Third International Symposium on Information Assurance and Security, Sep. 10, 2007, pp. 191-196.
S. Scott-Hayward, et al., "A Survey of Security in Software Defined Networks", IEEE Communications Surveys Tutorials, vol. 18, Issue 1, Jul. 6, 2015, pp. 623-654.
Sakir Sezer, et al., "Are we Ready for SDN? Implementation Challenges for Software-Defined Networks", IEEE Communications Magazine 51, Jul. 2013, pp. 36-43.
D. Senie, et al., "Network Ingress Filtering: Defeating Denial of Service Attacks which Employ IP Source Address Spoofing", Technical Report, Internet Engineering Task Force, Jan. 1998. https://tools.ietf.org/html/rfc2827.
R. Stewart, "Stream Control Transmission Protocol", Technical Report, Sep. 2007. RFC 4960 Editor. http://www.rfc-editor.org/rfc/rfc4960.txt.

(56) References Cited

OTHER PUBLICATIONS

X. Xing, et al., "A Defense Mechanism Against the DNS Amplification Attack in SDN", Proceedings of the 2016 IEEE International Conference on Network Infrastructure and Digital Content, Jul. 13, 2017.

* cited by examiner

METHODS AND SYSTEMS FOR REDUCING UNWANTED DATA TRAFFIC IN A COMPUTER NETWORK

FIELD

The present invention relates to methods and systems for reducing unwanted data traffic. The present invention more particularly relates to reducing unwanted data traffic in a computer network due to a Distributed Reflection Denial of Service (DRDoS) attack.

BACKGROUND

In recent years there has been an unprecedented growth in the number and the size of DRDoS attacks. In such attacks, crafted requests are sent to genuine machines, called amplifiers, which return amplified responses to a spoofed IP address of a victim, completely exhausting victim's bandwidth. These responses can be hundreds or even thousands of times larger in size than the corresponding originating requests. For instance, Github, a well-known platform for software development, withstood such an attack while experiencing whopping bandwidth of 1.35 Tb/sec. Due to the low resource requirements from an attacker and the ease with which the attacker can remain anonymous, these attacks have quickly gained popularity.

According to the Akamai report, in the fourth quarter of 2017, DRDoS attacks increased by 4% comparing to Q4 2016, with DNS, CLDAP and NTP being the most abused protocols. Attackers continue to find new protocols vulnerable for amplification. For instance, recently attackers have started abusing CLDAP and Memcached.

Amplification attacks are possible due to four factors: (1) there is no possibility for a genuine machine to check if a request comes from an original IP address (no sender verification); (2) some protocols return a response considerably larger in size than the corresponding request (amplification); (3) there are many amplifiers in the Internet; and (4) traffic with spoofed IP addresses is allowed to pass network perimeters. A number of initiatives have been proposed to eliminate or reduce the influence of these factors. First, some vulnerable protocols have been patched either to completely eliminate the possibility of amplification or to reduce the amplification factor. Second, a number of services around the world have been launched to reveal vulnerable hosts and educate people how to fix the issue. Third, tools to shutdown or reduce the power of an attack by sending special commands to vulnerable hosts have been also proposed. Moreover, generally it is highly recommended to use stateful protocols, such as TCP or even better SCTP, where an interaction between a server and a client is not started until a connection is established.

However, the most effective way of dealing with DRDoS attacks is to prevent packets with forged source IP addresses passing through networks. This goal can be achieved if routing entities apply filtering of ingress traffic, allowing only the packets with valid source IP addresses to pass. Such recommendations have been provided in RFC 2827, which is better known as IETF's Best Current Practice document 38 (BCP 38). However, 18 years after this document appeared the recommended changes have not yet been applied universally. There are even more doubts if the changes will ever be implemented. Indeed, Internet Service Providers (ISPs) do not directly benefit from their implementation. This is because the recommendations require an ISP to spend its resources, both on the recommendation implementation and traffic filtering, while in fact forged traffic coming from external networks still affects the ISP. DRDoS attacks are therefore still a real threat to the Internet.

ISPs unknowingly suffer a lot from this unwanted traffic. First, it exhausts ISPs' and their customers' bandwidth affecting the Quality of Service (QoS) offered. Second, ISPs are usually entitled to pay for the traffic (especially, if it is asymmetric) leaving the network. Hence, ISPs are interested to reduce the amount of outgoing traffic. At the same time, the traffic generated by amplifiers hosted within the perimeter of an ISP network may reach substantial amounts. For instance, typically a single host vulnerable to NTP amplification could generate more than 2 TB of garbage traffic a day. At the same time, an ISP network may host hundreds or even thousands of such amplifiers that if abused, could potentially waste significant amount of ISP's resources and money.

FIG. 1 of the accompanying drawings exemplifies how a DRDoS attack works. An attacker (IP 198.51.100.1) issues requests to the preliminarily found hosts running vulnerable protocols called amplifiers (in our case, DNS server has IP 192.0.2.3 and NTP server is assigned with IP 192.0.2.2) with a spoofed source IP address that points to a victim (IP 203.0.113.4). Due to the existing functional vulnerabilities in these protocols, some types of requests (e.g., the monlist command in NTP) may generate considerably larger responses. Upon receiving this kind of request, the service replies with a much bigger response to the spoofed IP address of the victim (see the right-hand side of FIG. 1). Such requests can be sent to a large amount of amplifiers in the Internet, and their collective responses may completely exhaust victim or even ISP network.

The ease of launching, large scale impact with even limited resources make DRDoS attacks very popular among attackers. Moreover, the reflective nature of these attacks brings an additional benefit to adversaries, allowing them to stay anonymous. Indeed, when a packet arrives to a victim or to a vulnerable host there is no possibility to find out attacker's source IP because it is spoofed.

There is a need for an improved method and system for reducing unwanted data traffic in a computer network due to a DRDoS attack.

SUMMARY

According to one aspect of the present disclosure, there is provided a computer-implemented method for reducing unwanted data traffic in a computer network due to a Distributed Reflection Denial of Service (DRDoS) attack, the method comprising: receiving requests at a filtering module; operating the filtering module in a normal mode in which the filtering module communicates the requests to a network device and a honeypot device in the computer network; and inspecting the requests received at the honeypot device to determine if the requests comprise a plurality of attack requests that form part of a DRDoS attack and, if the requests comprise a plurality of attack requests, configuring the filtering module to operate in a blocking mode in which the filtering module blocks further attack requests from being communicated to the network device while continuing to communicate further attack requests to the honeypot device, such that the honeypot device can continue to monitor attack requests during the DRDoS attack.

In some embodiments, the method comprises determining if a plurality of requests received at the honeypot device are attack requests by identifying if the plurality of requests each comprise the same source IP address and the same destination port.

In some embodiments, the method further comprises: grouping the attack requests which comprise the same source IP address and the same destination port into a flow group which corresponds to a DRDoS attack.

In some embodiments, if, during the inspection of the requests, the method identifies attack requests having a plurality of different source IP addresses and a plurality of different destination ports, the method comprises grouping the attack requests into a plurality of flow groups, and the method further comprises configuring the filtering module to operate in a separate blocking mode for each flow group to block the attack requests for each respective flow group from being communicated to the network device.

In some embodiments, the method further comprises identifying the subnet of each attack request and, if the method identifies that there are a plurality of attack requests corresponding to the same subnetwork, the method comprises configuring the filtering module to operate in the blocking mode to block all requests corresponding to that subnetwork and the same destination port from being communicated to the network device.

In some embodiments, the method comprises determining if a plurality of requests received at the honeypot device are attack requests by performing deep packet inspection to identify if the plurality of requests each comprise the same protocol command.

In some embodiments, the method further comprises: configuring the filtering module to operate in the blocking mode if the number of attack requests received at the honeypot device over a first predetermined period of time is above a first predetermined threshold.

In some embodiments, the method further comprises: storing a packet timestamp of each attack request with the same source IP address and the same destination port in a queue; computing the time difference between the earliest packet timestamp in the queue and the most recent packet timestamp added to the queue; comparing the time difference with the first predetermined period of time and, if the time difference is less than or equal to the first predetermined period of time, identifying the number of packet timestamps in the queue and comparing the number of packet timestamps with the first predetermined threshold; configuring the filtering module to operate in the blocking mode if the number of packet timestamps is above the first predetermined threshold and the time difference is below the first predetermined period of time.

In some embodiments, the method further comprises: monitoring the number of further attack requests received at the honeypot device over a second predetermined period of time and, if the number of further attack requests received at the honeypot device over the second predetermined period of time falls to below a second predetermined threshold, configuring the filtering module to return to the normal mode of operation.

In some embodiments, if the honeypot device receives a request comprising a source IP address and a destination port matching a flow group, the method further comprises: storing a packet timestamp of the request in a queue for the flow group; computing the time difference between the earliest packet timestamp in the queue and the most recent packet timestamp added to the queue; comparing the time difference with the second predetermined period of time and, if the time difference is equal to or greater than the second predetermined period of time, identifying the number of packet timestamps in the queue and comparing the number of packet timestamps with the second predetermined threshold; and if the number of packet timestamps is below the second predetermined threshold and the time difference is above the second predetermined period of time, configuring the filtering module to return to the normal mode of operation.

In some embodiments, the method further comprises: configuring the honeypot device to prevent the honeypot device from enacting attack requests received at the honeypot device when the filtering module is operating in the blocking mode.

In some embodiments, the method further comprises: generating a firewall rule which, when implemented, configures the filtering module to operate in the blocking mode.

In some embodiments, the firewall rule configures the filtering module to perform traffic shaping when the filtering module is operating in the blocking mode.

In some embodiments, the method further comprises: cancelling the firewall rule to configure the filtering module to return to the normal mode of operation.

According to another aspect of the present disclosure, there is provided a computer program product comprising instructions which, when executed by a computing system, cause the computing system to: receive requests at a filtering module; operate the filtering module in a normal mode in which the filtering module communicates the requests to a network device and a honeypot device in the computer network; and inspect the requests received at the honeypot device to determine if the requests comprise a plurality of attack requests that form part of a DRDoS attack and, if the requests comprise a plurality of attack requests, configuring the filtering module to operate in a blocking mode in which the filtering module blocks further attack requests from being communicated to the network device while continuing to communicate further attack requests to the honeypot device, such that the honeypot device can continue to monitor attack requests during the DRDoS attack.

According to another aspect of the present disclosure, there is provided a computer readable medium storing instructions which, when executed by a computing system, cause the computing system to: receive requests at a filtering module; operate the filtering module in a normal mode in which the filtering module communicates the requests to a network device and a honeypot device in the computer network; and inspect the requests received at the honeypot device to determine if the requests comprise a plurality of attack requests that form part of a DRDoS attack and, if the requests comprise a plurality of attack requests, configuring the filtering module to operate in a blocking mode in which the filtering module blocks further attack requests from being communicated to the network device while continuing to communicate further attack requests to the honeypot device, such that the honeypot device can continue to monitor attack requests during the DRDoS attack.

According to another aspect of the present disclosure, there is provided a system for reducing unwanted data traffic in a computer network due to a DRDoS attack, the system comprising: a network device; a honeypot device which is coupled for communication with the network device; and a filtering module which is coupled for communication with the network device and the honeypot device, the filtering module being configured to receive requests and configured to operate in a normal mode in which the filtering module communicates the requests to the network device and the honeypot device, wherein: the honeypot device is configured to inspect the requests received at the honeypot device to determine if the requests comprise a plurality of attack requests that form part of a DRDoS attack and, if the requests comprise a plurality of attack requests, the honeypot device is operable to configure the filtering module to operate in a blocking mode in which the filtering module blocks further attack requests from being communicated to the network device while continuing to communicate further attack requests to the honeypot device.

In some embodiments, the system further comprises: a DRDoS firewall module which is configured to generate a firewall rule which, when implemented, configures the filtering module to operate in the blocking mode.

In some embodiments, the firewall rule configures the filtering module to perform traffic shaping when the filtering module is operating in the blocking mode.

In some embodiments, the system is configured to cancel the firewall rule to configure the filtering module to return to the normal mode of operation.

In some embodiments, the filtering module is a module in a software defined networking (SDN) network which comprises an SDN controller module which is coupled for communication with the filtering module, the SDN controller module being operable to configure the filtering module according to the generated firewall rules.

In some embodiments, the filtering module is a firewall switch device which is configured to operate in the blocking mode in response to firewall rules generated by the DRDoS firewall module.

In some embodiments, the filtering module is provided at the edge of a computer network and configured to receive requests from outside the computer network and to communicate the requests to the network device and the honeypot device which are provided within the computer network.

In some embodiments, the honeypot device is configured to determine if a plurality of requests received at the honeypot device are attack requests by identifying if the plurality of requests each comprise the same source IP address and the same destination port.

In some embodiments, the system is configured to group attack requests which comprise the same source IP address and the same destination port into a flow group which corresponds to a DRDoS attack.

In some embodiments, the system is configured to: identify attack requests having a plurality of different source IP addresses and a plurality of different destination ports; group the attack requests into a plurality of flow groups; and configure the filtering module to operate in a separate blocking mode for each flow group to block the attack requests for each respective flow group from being communicated to the network device.

In some embodiments, the system is configured to identify the subnet of each attack request and, if the system identifies that there are a plurality of attack requests corresponding to the same subnetwork, the system is operable to configure the filtering module to operate in the blocking mode to block all requests corresponding to that subnetwork and the same destination port from being communicated to the network device.

In some embodiments, the system is configured to determine if a plurality of requests received at the honeypot device are attack requests by performing deep packet inspection to identify if the plurality of requests each comprise the same protocol command.

In some embodiments, the system is configured to configure the filtering module to operate in the blocking mode if the number of attack requests received at the honeypot device over a first predetermined period of time is above a first predetermined threshold.

In some embodiments, the system is configured to: store a packet timestamp of each attack request with the same source IP address and the same destination port in a queue; compute the time difference between the earliest packet timestamp in the queue and the most recent packet timestamp added to the queue; compare the time difference with the first predetermined period of time and, if the time difference is less than or equal to the first predetermined period of time, identify the number of packet timestamps in the queue and compare the number of packet timestamps with the first predetermined threshold; and configure the filtering module to operate in the blocking mode if the number of packet timestamps is above the first predetermined threshold and the time difference is below the first predetermined period of time.

In some embodiments, the honeypot device is configured to monitor the number of further attack requests received at the honeypot device over a second predetermined period of time and, if the number of further attack requests received at the honeypot device over the second predetermined period of time falls to below a second predetermined threshold, configure the filtering module to return to the normal mode of operation.

In some embodiments, if the honeypot device receives a request comprising a source IP address and a destination port matching a flow group, the system is configured to: store a packet timestamp of the request in a queue for the flow group; compute the time difference between the earliest packet timestamp in the queue and the most recent packet timestamp added to the queue; compare the time difference with the second predetermined period of time and, if the time difference is equal to or greater than the second predetermined period of time, identifying the number of packet timestamps in the queue and comparing the number of packet timestamps with the second predetermined threshold; and if the number of packet timestamps is below the second predetermined threshold and the time difference is above the second predetermined period of time, configure the filtering module to return to the normal mode of operation.

In some embodiments, the system is configured to prevent the honeypot device from enacting attack requests received at the honeypot device when the filtering module is operating in the blocking mode.

BRIEF DESCRIPTION OF THE DRAWINGS

So that the present invention may be more readily understood, embodiments of the present invention will now be described, by way of example, with reference to the accompanying drawings, in which.

DETAILED DESCRIPTION

Figure 1:
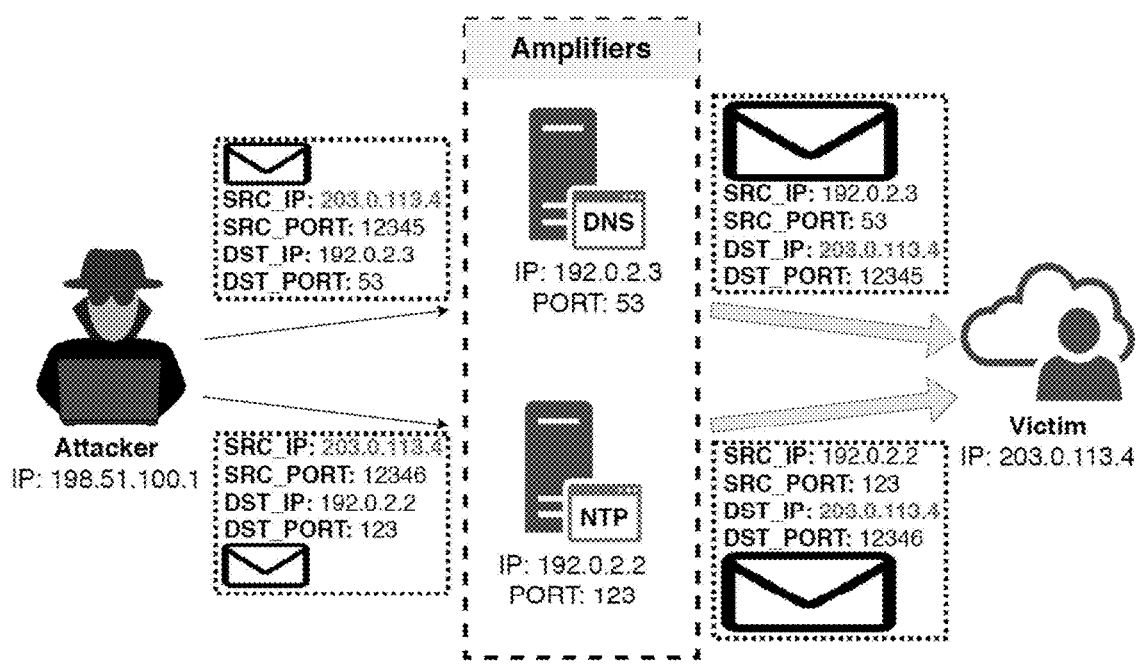
FIG. 1 is a diagram explaining a DRDoS attack.

Embodiments of the present invention seek to detect spoofed traffic and filter it out at the edge of an ISP network in near real time. This prevents garbage traffic being generated by amplifiers located within the network, thereby reducing the load on the resources of an Internet Service Provider (ISP). ISPs therefore benefit directly from the improvements provided by the system. Moreover, the system also seeks to aid other Internet citizens indirectly. First, the system can help to reduce or completely eliminate (if being deployed world-wide) attack traffic to victims. Second, the system encourages ISPs to implement the IETF's Best Current Practice document 38 (BCP 38).

The system uses a honeypot device, referred to hereinafter as an Amplification Honeypot, which is provided within a computer network. The Amplification Honeypot is a network connected computing device, such as a server or a virtual server running or proxying one or more protocols that are vulnerable to amplification attacks. For instance, the Amplification Honeypot may simulate running vulnerable DNS and NTP protocols. The Amplification Honeypot is deployed within the perimeter of an ISP network to provide information about an occurring attack. The system of some embodiments can also receive the data about amplification attacks from external sources. The Amplification Honeypot is not typically used by benign clients because it does not usually advertise its services. Therefore, only malicious users, who have previously scanned the network and discovered the amplification honeypot as a vulnerable host, will employ it for an attack. Benignly participating in the attack, the honeypot collects information, namely the victim's IP address and what service is being abused. An ISP can use this information to stop spoofed traffic entering its network. As a result, the spoofed traffic will not reach other vulnerable hosts or network devices in the network and will not be amplified.

The system of some embodiments uses a Software Defined Networking (SDN) paradigm to filter out spoofed traffic. In particular, some embodiments incorporate an SDN Firewall application that, having information from the Amplification Honeypot, automatically deploys firewall rules on edge switches that drop spoofed traffic. The SDN provides a generic interface with which to interact with network devices, making the system vendor-agnostic. Hence, the system can be deployed easily in networks having SDN capabilities. In other embodiments, the system may use other ways to block spoofed traffic, e.g., border gateway protocol flow specification (BGP Flowspec), hardware or software firewalls.

The system of some embodiments may be also adapted for traditional networks (i.e. networks that do not use SDN) given an interface which enables the system to interact with traditional network devices (e.g. hardware switches).

The Amplification Honeypot carefully participates in the attacks through a number of limiting mechanisms. As a result, a victim receives negligible amplified traffic from Amplification Honeypot and any amplified traffic is only received in the beginning of an attack. The Amplification Honeypot does not advertise itself to clients. Adversaries discover the Amplification Honeypot when they perform Internet-wide scanning to find vulnerable services. Scanning is similar to an attack: the same requests which may result in amplified response are sent.

However, in this case attackers do not spoof IP address receiving back a response. If they find from the response that the service is vulnerable to amplification, they add host's IP address to a list of amplifiers which are later used to launch attacks. Therefore, in order to be discovered, the Amplification Honeypot is forced to reply to the first several requests with amplified responses.

Figure 2:
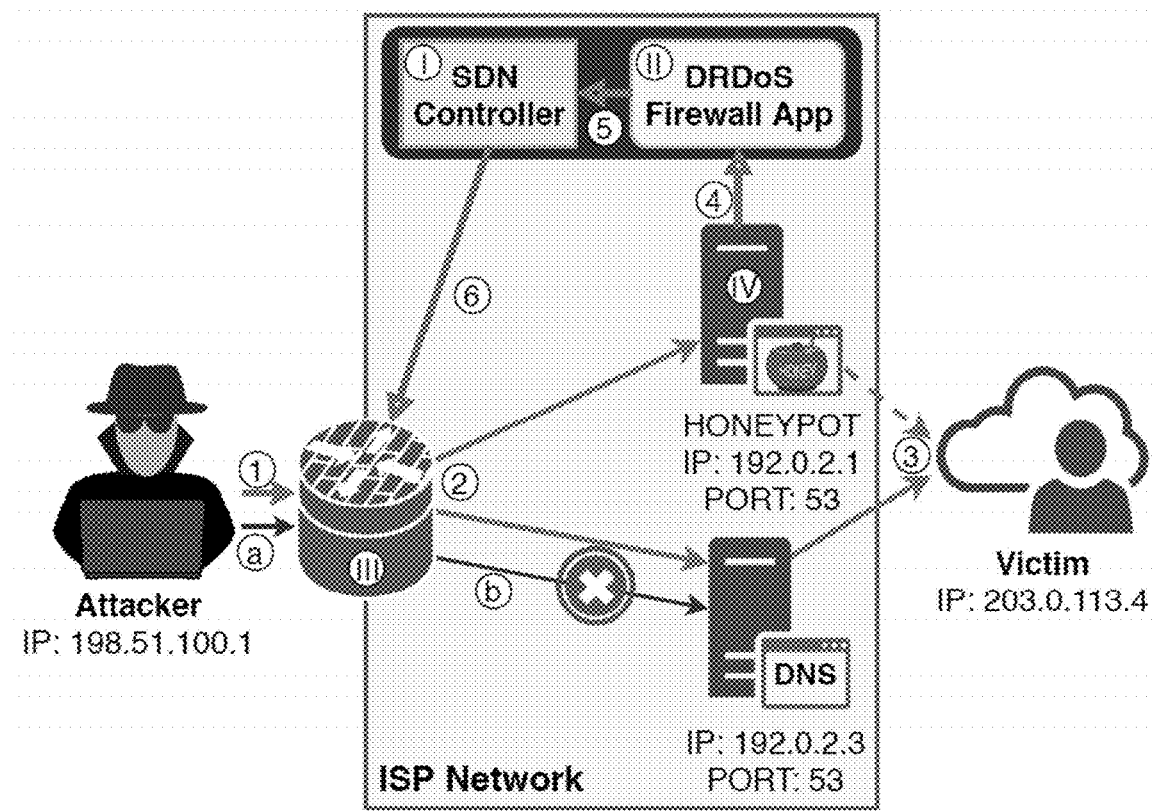
FIG. 2 is a diagram illustrating a high-level overview of a system of some embodiments.

FIG. 2 of the accompanying drawings provides a high-level overview of the system of some embodiments. There are four main components in the system (marked with Roman numerals):
I. SDN Controller which is also referred to hereinafter as SDN controller module;
II. DRDoS Firewall Application which is also referred to hereinafter as DRDoS firewall module;
III. SDN Forwarding Device which is also referred to hereinafter as filtering module; and
IV. Amplification Honeypot which is also referred to hereinafter as honeypot device or honeypot.

Figure 3:
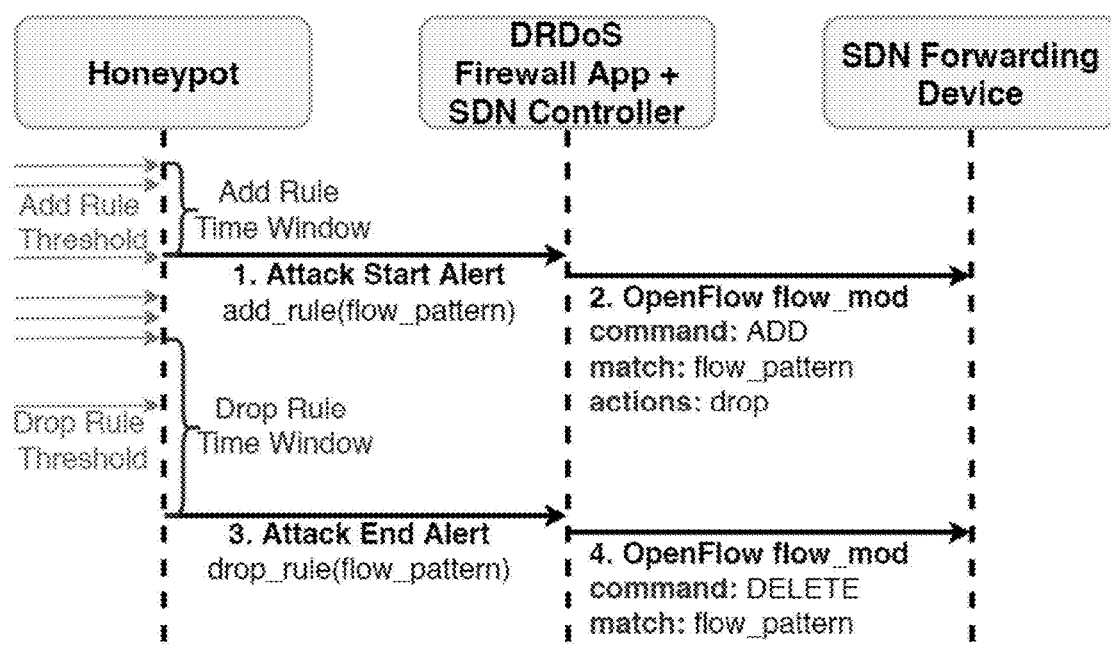
FIG. 3 is a diagram explaining the workflow of a system of some embodiments.

All incoming traffic to the ISP network passes through SDN Forwarding Device (filtering module) (Component III in FIG. 3). This edge device plays the role of firewall filtering out the traffic that matches defined flow rules. The flow rules are generated by the DRDoS Firewall Application based on the information provided by Amplification Honeypot. DRDoS Firewall Application uses the functionality provided by SDN Controller to deploy the rules on SDN Forwarding Device.

In some embodiments, the system is not SDN-based but instead uses a traditional network. In these embodiments, the roles of SDN Forwarding Device (filtering module) and SDN Controller are executed by a network device and a custom filtering module that deploys firewall rules on it derived from the honeypot data.

In order to launch an attack, an adversary will detect a first server or network device which is vulnerable for amplification. Let us assume that, during a preliminary scan, the adversary has discovered two hosts in the ISP's network vulnerable for DNS amplification attack: an open resolver with IP 192.0.2.3 and the honeypot with IP 192.0.2.1 (see FIG. 2).

During the attack, the adversary sends requests with a spoofed victim IP address to these two hosts (see arrows of Steps 1 and 2 in FIG. 2) targeting a vulnerable protocol running on a predefined UDP port (e.g., DNS runs on port 53).

At Step 3, the vulnerable server and the Amplification Honeypot generate amplified replies in response to the received requests. At this stage, the SDN Forwarding Device (filtering module) is still operating in a normal mode. However, the Amplification Honeypot also starts monitoring the attack and it inspects the requests received at the Amplification Honeypot to determine if the requests comprise a plurality of attack requests that form part of a DRDoS attack. In this embodiment, if the volume of requests received at the Amplification Honeypot exceeds a predefined threshold (the amount of the requests received in a period of time for a combination of victim IP address and destination UDP port) it stops issuing responses to attack requests and sends an alert to DRDoS Firewall Application (Step 4). This application through the SDN Controller (Step 5) issues an OpenFlow firewall rule to configure the SDN Forwarding Device (Step 6) to operate in a blocking mode in which the SDN Forwarding Device blocks all incoming packets with source IP address and destination port matching to the victim IP address and DNS port correspondingly. Hence, all consecutive requests from the attacker (Step a) will be blocked by the edge device and will not reach the vulnerable servers (Step b).

In some embodiments, the firewall rule configures the filtering module to perform traffic shaping when the filtering module is operating in the blocking mode. In these embodiments, the traffic shaping is a mechanism such as, but not limited to, throttling or redirection for additional inspection.

At the beginning of the operation, the DRDoS Firewall Application installs a rule on SDN Forwarding Device that prevents the traffic coming to Amplification Honeypot from being blocked (this rule has higher priority than the ones issued by DRDoS Firewall Application). Such whitelisting allows the honeypot to continue to monitor attack requests received during the DRDoS attack. Once the attack is over (no amplification requests are received within specified period of time), the honeypot notifies DRDoS Firewall Application to drop the corresponding firewall rule. Despite the whitelisting, the honeypot mildly participates in the attack (and only in the beginning) due to its internal rate limiting mechanisms.

Using such protection system, a provider can early stop the abuse of vulnerable services within its network. As a result, this saves the ISP's financial resources by filtering out the outgoing garbage traffic, for which ISPs are usually entitled to pay. Moreover, the system improves the ISP's Quality of Service and prevents customers' services from being abused. In addition, the system can help to reduce or completely eliminate (if being deployed world-wide) attack traffic to victims. Such filtering can also be applied to the transit traffic preventing vulnerable services in other ISP networks from being abused.

It should be noted that in some embodiments instead of DRDoS Firewall Application, a software application can be used that will interact with the edge device filtering mechanism (e.g., BGP Flowspec, software or hardware firewalls) to block spoofed traffic based on the data provided by the Amplification Honeypot or other similar agents.

FIG. 3 of the accompanying drawings explains the workflow of the system of some embodiments. The honeypot monitors all incoming packets sent by attackers (represented with arrows in FIG. 3), be them scans or attack requests. This gives the honeypot real-time visibility on ongoing amplification attacks. Packets are grouped into flows according to a key. For instance, the packets can be grouped together according to a unique tuple of source IP address and destination port. In some embodiments, the system is configured to group attack requests which comprise the same identified source IP address and the same destination port into a flow group which corresponds to a DRDoS attack.

In some embodiments, every flow corresponds either to attack or scan set of packets. Each unique flow is assigned with a counter that counts the number of packets which arrive within a predefined time interval (Add Rule Time Window in FIG. 3). If the number of packets exceeds a predetermined threshold (Add Rule Threshold), meaning that incoming packets belong to an attack rather than to a scan, the honeypot generates an Attack Start Alert.

The Attack Start Alert is sent to the DRDoS Firewall Application preferably together with the category identifier represented by flow_pattern. The DRDoS Firewall Application, using SDN Controller, issues an OpenFlow flow_mod instruction to the SDN Forwarding Device, requesting to add a new rule (command ADD) to drop packets (actions drop) fitting the criteria (matching flow_pattern, e.g., with specific source IP address and destination port). Thus, once the attack is detected, the SDN Forwarding Device will block all incoming packets matching the pattern.

In some embodiment, the system is configured to identify attack requests having a plurality of different source IP addresses and a plurality of different destination ports and to group attack requests into a plurality of flow groups. In these embodiments, the system configures the filtering module to operate in a separate blocking mode for each flow group to block the attack requests for each respective flow group from being communicated to a network device.

In some embodiments, the system is configured to determine if a plurality of requests received at the honeypot device are attack requests by performing deep packet inspection to identify if the plurality of requests each comprise the same protocol command (e.g. a protocol command that is vulnerable for amplification).

Once the rule is added, the honeypot starts to monitor when the attack is over. To detect this, the honeypot relies on two parameters: Drop Rule Time Window and Drop Rule Threshold. If the number of packets monitored on the honeypot drops below the latter threshold value, during the former time window, the honeypot instructs the DRDoS Firewall Application to remove the corresponding rule from the SDN Forwarding Device (Step 3 in FIG. 3). Drop Rule Threshold regulates how fast the rule is discarded from the SDN Forwarding Device.

In some embodiments, the system configures the filtering module to operate in the blocking mode if the number of attack requests received at the honeypot device over a first predetermined period of time is above a first predetermined threshold.

In some embodiments, the system is configured to store a packet timestamp of each attack request in a queue and to compute the time difference between the earliest packet timestamp in the queue and the most recent packet timestamp added to the queue. The system then compares the time difference with the first predetermined period of time. If the time difference is less than or equal to the first predetermined period of time, the system identifies the number of packet timestamps in the queue and comparing the number of packet timestamps with the first predetermined threshold. The system then configures the filtering module to operate in the blocking mode if the number of packet timestamps is above the first predetermined threshold.

The system is configured to monitor the number of further attack requests received at the honeypot device over a second predetermined period of time. If the number of further attack requests received at the honeypot device over the second predetermined period of time falls to below a second predetermined threshold, the system configures the filtering module to return to the normal mode of operation.

The system of some embodiments is therefore configured such that if the honeypot device receives a request comprising a source IP address and a destination port matching a flow group, the system stores a packet timestamp of the request in a queue for the flow group. The system then computes the time difference between the earliest packet timestamp in the queue and the most recent packet timestamp added to the queue and compares the time difference with the second predetermined period of time. If the time difference is equal to or greater than the second predetermined period of time, the system identifies the number of packet timestamps in the queue and compares the number of packet timestamps with the second predetermined threshold. If the number of packet timestamps is below the second predetermined threshold, the system configures the filtering module to return to the normal mode of operation.

In some embodiments, the system configures the honeypot device to prevent the honeypot device from enacting attack requests received at the honeypot device when the filtering module is operating in the blocking mode.

While in the embodiments described above, the system is configured to block attack requests corresponding to an identified source IP address (e.g., 1.1.1.1) and a destination port. In other embodiments the system is configured to block attack requests corresponding to an entire subnetwork (e.g. subnetwork 1.1.1.*) and a destination port. These embodiments result in fewer rules that must be enacted by the filtering module compared with embodiments in which a separate rule is required to block each source IP address and destination port.

An example test demonstrated that the system of one embodiment allows an ISP to filter out approximately 1,505 GB of garbage traffic a day. This test result was for the case when there is only one amplifier for each vulnerable protocol. However, in practice an ISP network will typically host thousands of such amplifiers.

Testing confirmed that the system of some embodiments is capable of filtering out substantial amounts of garbage traffic, thereby saving an ISP money and improving the QoS for its clients. Moreover, by restricting the number of vulnerable hosts participating in an attack, the system helps victims making the ongoing "storm" of an attack lighter or completely eliminating the attack.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A computer-implemented method for reducing unwanted data traffic in an Internet Service Provider (ISP) network due to a Distributed Reflection Denial of Service (DRDoS) attack, the ISP network comprising a plurality of network devices connected together in a computer network, wherein the method comprises:
   receiving requests at a filtering module provided at an edge of the ISP network, wherein the filtering module comprises a first processor and a first memory, and wherein the filtering module receives the requests from outside the ISP network;

operating the filtering module in a normal mode in which the filtering module communicates the requests to a network device of the plurality of network devices and a honeypot device in the ISP network, wherein the network device comprises a second processor and a second memory, and wherein the honeypot device comprises a third processor and a third memory;

inspecting the requests received at the honeypot device to determine if the requests comprise a plurality of attack requests that form part of a DRDoS attack and, if the requests comprise a plurality of attack requests, configuring the filtering module to operate in a blocking mode in which the filtering module blocks further attack requests from being communicated to the network device while continuing to communicate the further attack requests to the honeypot device, such that the honeypot device can continue to monitor attack requests during the DRDoS attack; and generating, by a DRDoS firewall module comprising a fourth processor and a fourth memory, a firewall rule which, when implemented, configures the filtering module to operate in the blocking mode.

2. The method of claim 1, wherein the method comprises determining if a plurality of requests received at the honeypot device are attack requests by identifying if the plurality of requests each comprise the same source IP address and the same destination port.

3. The method of claim 2, wherein the method further comprises:

grouping the attack requests which comprise the same source IP address and the same destination port into a flow group which corresponds to a DRDoS attack.

4. The method of claim 3, wherein if, during the inspection of the requests, the method identifies attack requests having a plurality of different source IP addresses and a plurality of different destination ports, the method comprises grouping the attack requests into a plurality of flow groups, and the method further comprises configuring the filtering module to operate in a separate blocking mode for each flow group to block the attack requests for each respective flow group from being communicated to the network device.

5. The method of claim 3, wherein the method further comprises identifying the subnet of each attack request and, if the method identifies that there are a plurality of attack requests corresponding to the same subnetwork, the method comprises configuring the filtering module to operate in the blocking mode to block all requests corresponding to that subnetwork and the same destination port from being communicated to the network device.

6. The method of claim 1, wherein the method comprises determining if a plurality of requests received at the honeypot device are attack requests by performing deep packet inspection to identify if the plurality of requests each comprise the same protocol command.

7. The method of claim 1, wherein the method further comprises:

configuring the filtering module to operate in the blocking mode if the number of attack requests received at the honeypot device over a first predetermined period of time is above a first predetermined threshold.

8. The method of claim 7, wherein the method further comprises:

storing a packet timestamp of each attack request with the same source IP address and the same destination port in a queue;

computing the time difference between the earliest packet timestamp in the queue and the most recent packet timestamp added to the queue;

comparing the time difference with the first predetermined period of time and, if the time difference is less than or equal to the first predetermined period of time, identifying the number of packet timestamps in the queue and comparing the number of packet timestamps with the first predetermined threshold; and configuring the filtering module to operate in the blocking mode if the number of packet timestamps is above the first predetermined threshold and the time difference is below the first predetermined period of time.

9. The method of claim 1, wherein the method further comprises:

monitoring the number of further attack requests received at the honeypot device over a second predetermined period of time and, if the number of further attack requests received at the honeypot device over the second predetermined period of time falls to below a second predetermined threshold, configuring the filtering module to return to the normal mode of operation.

10. The method of claim 9, wherein the method further comprises:

determining if a plurality of requests received at the honeypot device are attack requests by identifying if the plurality of requests each comprise the same source IP address and the same destination port; and grouping the attack requests which comprise the same source IP address and the same destination port into a flow group which corresponds to a DRDoS attack, wherein if the honeypot device receives a request comprising a source IP address and a destination port matching a flow group, the method comprises:

storing a packet timestamp of the request in a queue for the flow group;

computing the time difference between the earliest packet timestamp in the queue and the most recent packet timestamp added to the queue;

comparing the time difference with the second predetermined period of time and, if the time difference is equal to or greater than the second predetermined period of time, identifying the number of packet timestamps in the queue and comparing the number of packet timestamps with the second predetermined threshold; and if the number of packet timestamps is below the second predetermined threshold and the time difference is above the second predetermined period of time, configuring the filtering module to return to the normal mode of operation.

11. The method of claim 1, wherein the method further comprises:

configuring the honeypot device to prevent the honeypot device from enacting attack requests received at the honeypot device when the filtering module is operating in the blocking mode.

12. The method of claim 1, wherein the firewall rule configures the filtering module to perform traffic shaping when the filtering module is operating in the blocking mode.

13. The method of claim 1, wherein the method further comprises:

cancelling the firewall rule to configure the filtering module to return to the normal mode of operation.

14. A system for reducing unwanted data traffic in an Internet Service Provider (ISP) network due to a Distributed Reflection Denial of Service (DRDoS) attack, the ISP network comprising a plurality of network devices connected together in a computer network, and wherein the system comprises:
  a first processor; and
  a first memory;
  wherein the first memory storing executable instructions which, when executed by the first processor, cause the system to:
    receive requests at a filtering module provided at an edge of the ISP network, wherein the filtering module comprises a second processor and a second memory, and wherein the filtering module receives the requests from outside the ISP network;
    operate the filtering module in a normal mode in which the filtering module communicates the requests to a network device of the plurality of network devices and a honeypot device in the ISP network, wherein the network device comprises a third processor and a third memory, and wherein the honeypot device comprises a fourth processor and a fourth memory;
    inspect the requests received at the honeypot device to determine if the requests comprise a plurality of attack requests that form part of a DRDoS attack and, if the requests comprise a plurality of attack requests, configure the filtering module to operate in a blocking mode in which the filtering module blocks further attack requests from being communicated to the network device while continuing to communicate the further attack requests to the honeypot device, such that the honeypot device can continue to monitor attack requests during the DRDoS attack; and
    generating, by a DRDoS firewall module comprising a fifth processor and a fifth memory, a firewall rule which, when implemented, configures the filtering module to operate in the blocking mode.

15. A system for reducing unwanted data traffic in an Internet Service Provider (ISP) network due to a Distributed Reflection Denial of Service (DRDoS) attack, the ISP network comprising a plurality of network devices connected together in a computer network, wherein the system comprises:
  a network device comprising a first processor and a first memory, the first memory storing executable instructions which, when executed by the first processor, cause the first processor to perform at least one function of the network device;
  a honeypot device provided within the ISP network, the honeypot device comprising a second processor and a second memory, the second memory storing executable instructions which, when executed by the second processor, cause the second processor to perform at least one function of the honeypot device, wherein the honeypot device is coupled for communication with the network device;
  a filtering module provided at an edge of the ISP network, the filtering module comprising a third processor and a third memory, the third memory storing executable instructions which, when executed by the third processor, cause the third processor to perform at least one function of the filtering module, wherein the filtering module receives requests from outside the ISP network, wherein the filtering module is coupled for communication with the network device and the honeypot device, the filtering module being configured to receive the requests and configured to operate in a normal mode in which the filtering module communicates the requests to the network device and the honeypot device, wherein:
    the honeypot device is configured to inspect the requests received at the honeypot device to determine if the requests comprise a plurality of attack requests that form part of a DRDoS attack and, if the requests comprise a plurality of attack requests, the honeypot device is operable to configure the filtering module to operate in a blocking mode in which the filtering module blocks further attack requests from being communicated to the network device while continuing to communicate the further attack requests to the honeypot device; and
  a DRDoS firewall module comprising a fourth processor and a fourth memory, the fourth memory storing executable instructions which, when executed by the fourth processor, cause the fourth processor to perform at least one function of the DRDoS firewall module, wherein the DRDoS firewall module is configured to generate a firewall rule which, when implemented, configures the filtering module to operate in the blocking mode.

16. The system of claim 15, wherein the firewall rule configures the filtering module to perform traffic shaping when the filtering module is operating in the blocking mode.

17. The system of claim 15, wherein the system is configured to cancel the firewall rule to configure the filtering module to return to the normal mode of operation.

18. The system of claim 15, wherein the filtering module is a module in a software defined networking (SDN) network which comprises an SDN controller module which is coupled for communication with the filtering module, the SDN controller module being operable to configure the filtering module according to firewall rules generated by the DRDoS firewall module.

19. The system of claim 15, wherein the filtering module is a firewall switch device which is configured to operate in the blocking mode in response to firewall rules generated by the DRDoS firewall module.

20. The system of claim 15, wherein the honeypot device is configured to determine if a plurality of requests received at the honeypot device are attack requests by identifying if the plurality of requests each comprise the same source IP address and the same destination port.

21. The system of claim 20, wherein the system is configured to group attack requests which comprise the same source IP address and the same destination port into a flow group which corresponds to a DRDoS attack.

22. The system of claim 21, wherein the system is configured to:
  identify attack requests having a plurality of different source IP addresses and a plurality of different destination ports;
  group the attack requests into a plurality of flow groups; and
  configure the filtering module to operate in a separate blocking mode for each flow group to block the attack requests for each respective flow group from being communicated to the network device.

23. The system of claim 21, wherein the system is configured to identify the subnet of each attack request and, if the system identifies that there are a plurality of attack requests corresponding to the same subnetwork, the system is operable to configure the filtering module to operate in the blocking mode to block all requests corresponding to that subnetwork and the same destination port from being communicated to the network device.

24. The system of claim 15, wherein the system is configured to determine if a plurality of requests received at the honeypot device are attack requests by performing deep packet inspection to identify if the plurality of requests each comprise the same protocol command.

25. The system of claim 15, wherein the system is configured to configure the filtering module to operate in the blocking mode if the number of attack requests received at the honeypot device over a first predetermined period of time is above a first predetermined threshold.

26. The system of claim 25, wherein the system is configured to:
   store a packet timestamp of each attack request with the same source IP address and the same destination port in a queue;
   compute the time difference between the earliest packet timestamp in the queue and the most recent packet timestamp added to the queue;
   compare the time difference with the first predetermined period of time and, if the time difference is less than or equal to the first predetermined period of time, identify the number of packet timestamps in the queue and compare the number of packet timestamps with the first predetermined threshold; and
   configure the filtering module to operate in the blocking mode if the number of packet timestamps is above the first predetermined threshold and the time difference is below the first predetermined period of time.

27. The system of claim 15, wherein the honeypot device is configured to monitor the number of further attack requests received at the honeypot device over a second predetermined period of time and, if the number of further attack requests received at the honeypot device over the second predetermined period of time falls to below a second predetermined threshold, configure the filtering module to return to the normal mode of operation.

28. The system of claim 27, wherein the honeypot device is configured to:
   determine if a plurality of requests received at the honeypot device are attack requests by identifying if the plurality of requests each comprise the same source IP address and the same destination port; and
   group attack requests which comprise the same source IP address and the same destination port into a flow group which corresponds to a DRDoS attack, wherein if the honeypot device receives a request comprising a source IP address and a destination port matching a flow group, the system is configured to:
      store a packet timestamp of the request in a queue for the flow group;
      compute the time difference between the earliest packet timestamp in the queue and the most recent packet timestamp added to the queue;
      compare the time difference with the second predetermined period of time and, if the time difference is equal to or greater than the second predetermined period of time, identifying the number of packet timestamps in the queue and comparing the number of packet timestamps with the second predetermined threshold; and
      if the number of packet timestamps is below the second predetermined threshold and the time difference is above the second predetermined period of time, configure the filtering module to return to the normal mode of operation.

29. The system of claim 15, wherein the system is configured to prevent the honeypot device from enacting attack requests received at the honeypot device when the filtering module is operating in the blocking mode.

* * * * *